Feb. 13, 1962  W. HAMILTON ET AL  3,021,165
HATCH COVER DOG

Filed Dec. 15, 1959  3 Sheets-Sheet 1

INVENTORS
WALLACE HAMILTON
BY PETER P. SURSO

ATTORNEY

Feb. 13, 1962 W. HAMILTON ET AL 3,021,165
HATCH COVER DOG
Filed Dec. 15, 1959 3 Sheets-Sheet 2

INVENTORS
WALLACE HAMILTON
BY PETER P. SURSO

ATTORNEY

United States Patent Office 3,021,165
Patented Feb. 13, 1962

3,021,165
HATCH COVER DOG
Wallace Hamilton, Chagrin Falls, and Peter P. Surso, Euclid, Ohio, assignors, by mesne assignments, to PneumoDynamics Corporation, Cleveland, Ohio, a corporation of Delaware
Filed Dec. 15, 1959, Ser. No. 859,770
8 Claims. (Cl. 292—256.5)

This invention relates generally to securing latches and more particularly to a fastener or dog adapted to secure a marine hatch cover in position.

It is an important object of this invention to provide a simple low cost hatch cover dog which is durable and easily operated.

It is another object of this invention to provide a hatch cover dog which requires a minimum amount of machining.

It is another object of this invention to provide a hatch cover dog which is simple to operate and which is substantially immune to damage during use.

Further objects and advantages will appear from the following description and drawings, wherein.

A latch or dog assembly according to this invention is particularly suited for use in securing hatch covers to the coaming of ships to prevent their being washed overboard during storms and to insure that the hatch cover seal is properly compressed. It should be understood that a latch of this type could be used to releasably conect other types of articles and the invention should not be limited to hatch covers per se even through it is illustrated only in connection with such an installation.

Figure 1:
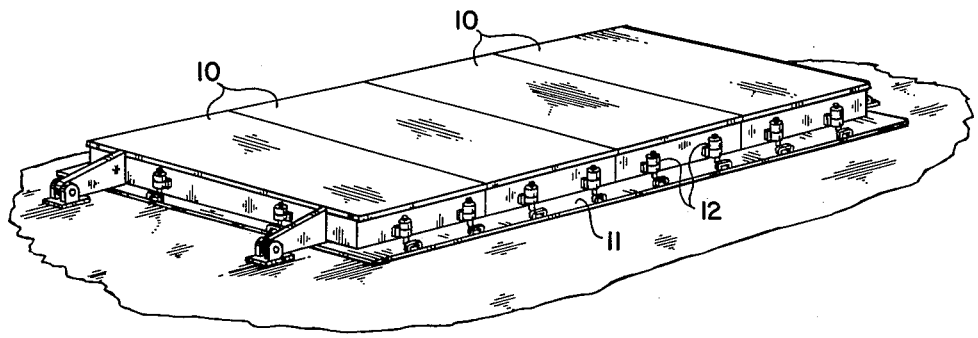
FIGURE 1 is a perspective view of a typical hatch cover with latching or dog devices according to this invention installed thereon.

In FIGURE 1, a typical hatch cover is shown which includes four panels 10 which extend over and close a hatchway defined by a coaming 11 on the deck structure of a ship. In the particular hatch cover shown, the panels 10 are formed of strutted steel and are hinged for power operation in a manner disclosed and claimed in the U.S. patent to Joseph E. Hannigan, No. 2,906,324 dated September 29, 1959. The panels 10 can be operated when the latches are released to fold back and open the hatchway. For a complete description of the operation of the structural details of such panels, reference should be made to the cited patent.

Figure 2:
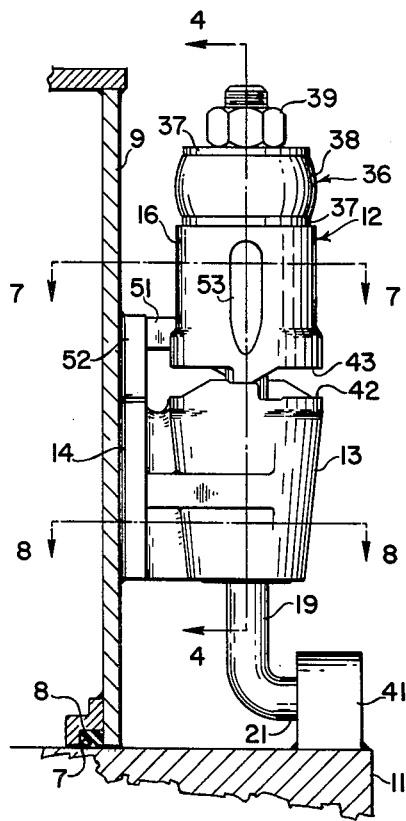
FIGURE 2 is a side elevation showing the hatch cover dog in the locked position.
Figure 3:
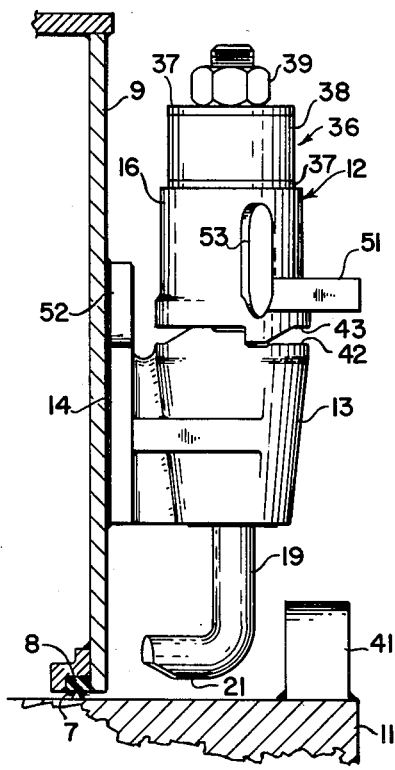
FIGURE 3 is a view similar to FIGURE 2 showing the hatch cover dog in the unlocked or released position.
Figure 7:
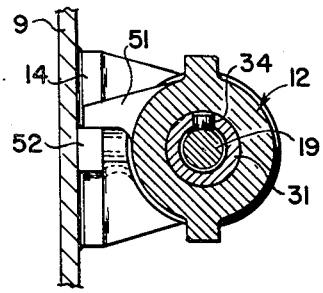
FIGURE 7 is a cross section taken along 7—7 of FIGURE 2.

Referring to FIGURES 2 and 3, each panel 10 is provided with a side wall 9 which engages the coaming 11 and a resilient seal 8 engaging a projection 7 to provide a fluid tight joint with the coaming. The engagement of the side wall 9 with the coaming 11 provides the support of the panel 10 and prevents overcompression of the seal. To provide positive locking of the panels to the coaming, a plurality of latch or dog assemblies 12 are positioned around the periphery of the cover and connect the panels to the coaming in a positive mechanical manner. Each of these assemblies includes the structure disclosed in FIGURES 2 through 4 so a description of a single latch or dog device applies equally to all of the others.

Figure 4:
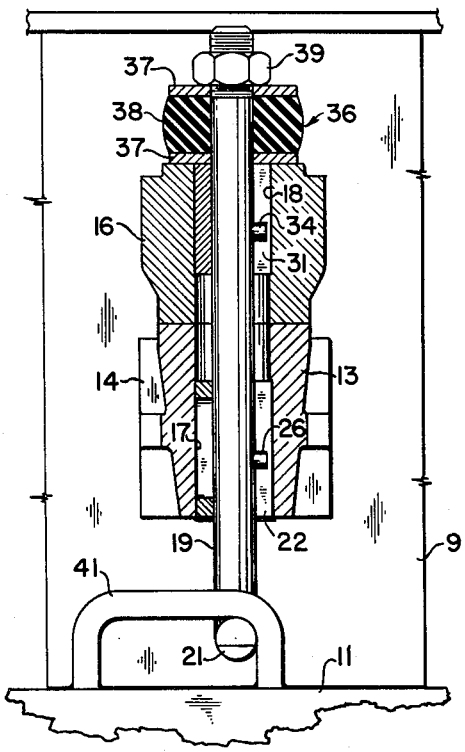
FIGURE 4 is a longitudinal section taken along 4—4 of FIGURE 2 illustrating the internal structure of the dog.

The latch assembly 12 includes a base member 13 formed with a laterally projecting mounting portion 14 welded to the side wall 9. An operating member 16 is positioned above the base member 13 and is rotatable relative thereto. Referring to FIGURE 4, the base member 13 is formed with an axial bore 17 and the operating member 16 is formed with an axial bore 18. A locking hook 19 extends through the two bores 17 and 18 and is formed of a rod terminating at its lower end in a hook 21.

Figures 9, 10:
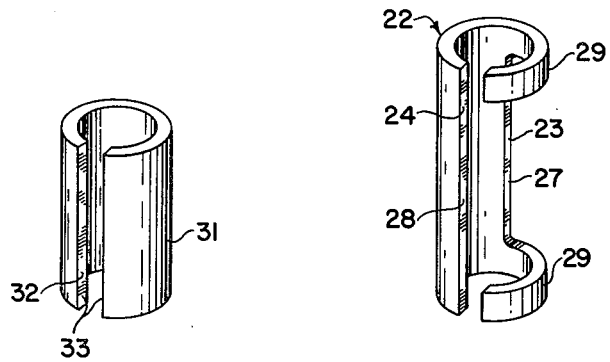
FIGURE 9 is an enlarged perspective view of the drive sleeve used to rotate the latching hook.
FIGURE 10 is an enlarged perspective view of the stop sleeve used to limit the amount of rotation of the latching hook.

A stop sleeve 22 is positioned within the bore 17 and is tack welded so that it cannot move relative to the base member 13. This sleeve, which is best illustrated in FIGURE 10, is formed of a tubular stock machined away to provide a centrally located recess portion 23 and is formed with an axial notch 24 so that it can be easily compressed into the base member 13. A stop pin 26 is mounted on the locking hook 19 and is positioned within the recess portion 23 when the device is assembled. The axial extent of the recess portion 23 is proportioned so that the stop pin 26 is retained within the recess portion regardless of the position of the locking hook 19. The recess portion 23 provides opposed axially extending walls 27 and 28 which engage the stop pin 26 and limit the rotational movement of the locking hook 19 to 180 degrees even though the locking hook can move axially relative to the base member. The upper and lower ends of the stop sleeve 22 provide bearing portions 29 to radially support the locking hook 19. The axial notch 24 is proportioned to permit insertion of the stop pin 26 during the assembly of the device.

A cylindrical drive sleeve 31 is positioned in the bore 18 of the operating member 16 to provide the driving connection for rotating the locking hook 19 with the operating member 16. The drive sleeve 31, which is best shown in FIGURE 9, is provided with an axial notch 32 which serves two purposes. The first is to permit the drive sleeve to be compressed slightly when it is placed within the bore 18 and also provides opposed axial extending walls 33 between which is positioned a second stop pin 34 mounted on the locking hook 19. The drive sleeve 31 and the stop sleeve 22 are proportioned so that there is a loose fit between the sleeves and the locking hook 19 so that dirt or corrosion will not hinder the operation of the device. Because the drive sleeve 31 is positioned within the bore 18 with a press fit, friction tends to rotate the drive sleeve 31 and the locking hook 19 through the stop pin 34 with the operating member 16 when the latter is rotated. Here again, the axial notch 32 permits relative axial movement between the drive sleeve 31 and the locking hook 19.

Positioned above the operating member 16 is a resilient assembly 36 which includes two thrust washers 37 and a rubber washer 38. Above the resilient assembly 36 is a nut 39 which is threaded onto the upper end of the locking hook 19. A U-shaped keeper 41 is welded to the coaming 11 and is adapted to receive the hook 21 when the latch assembly 12 is in the locked position. The keeper 41 is positioned so that the hook 21 engages one side wall when the latch assembly 12 is locked and provides clearance to permit rotation of the hook 21 to release the mechanism.

The upper face of the base member 13 is formed with a lower cam surface 42 which co-operates with an upper cam surface 43 formed on the operating member 16. When the operating member is rotated to the locked position of FIGURE 2, the two cams 42 and 43 operate to move the operating member 16 axially upward relative to the base member 13 so that the rubber washer 38 is compressed and the hook 21 is in tight engagement with the keeper 41. Rotation of the operating member 16 to the unlocked position of FIGURE 3 causes the cams to move to a second position at which time the operating member 16 is lowered relative to the base member 13 to permit the locking hook 19 to move down and out of the keeper 41.

Figure 5:
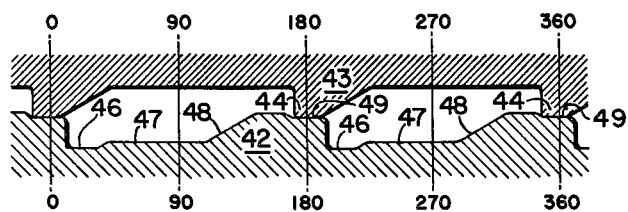
FIGURE 5 is a cam profile illustrating the cam position when the dog is in the latched or locked position.
Figure 6:
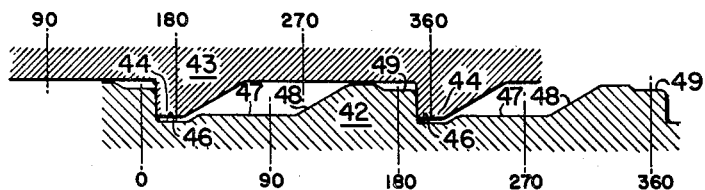
FIGURE 6 is a cam profile similar to FIGURE 5 illustrating the positions of the cams when the dog is released.

In FIGURES 5 and 6 respectively, cam profiles of the cams 42 and 43 are shown in the locked and unlocked positions. Movement of the upper cam 43 to the right, as viewed in FIGURES 5 and 6, from the unlocked position of FIGURE 6 causes the lobes 44 to move out of the retaining recesses 46 and along horizontal portions 47 until the lobes 44 engage inclines 48 which cam the operating member 16 upwardly relative to the base member 13. During the rotation of the operatnig member 16 to the point where the lobes 44 engage the inclines 48, the hook 21 is rotated by the drive sleeve 31 until it engages the side wall of the keeper 41. Additional rotation of the operating member 16 to the locked position of FIGURES 2 and 4 does not cause additional rotation of the hook 21 because of its engagement with the side of the keeper 41 so the drive sleeve 31 slides within the bore 18. This additional rotation of the operating member 16 does, however, move the operating member 16 upward relative to the base member 13 which causes the hook 21 to engage the upper wall of the keeper 41 and results in compression of the rubber washer 38. The nut 39 should be adjusted to provide the proper compression of the rubber washer 38 so that the latch assembly 12 will provide the desired securing force.

The lower cam 42 is formed with second shallow retaining recesses 49 into which the lobes 44 move when the device is in the locked position. To prevent rotation of the operating member 16 beyond the locked position, a projection 51 is formed on the operating member 16 which is proportioned to engage a stop 52 formed on the mounting portion 14.

In order to permit easy operation of the latch assembly 12, the operating member 16 is formed with opposed wrench projections 53. A tubular wrench formed with notches to receive these wrenching projections 53 can, therefore, be slipped over the upper end of the latch assembly 12 to manually rotate the operating member 16 between the locked and unlocked positions. This wrench has not been shown but is formed from a piece of tubular stock having axial notches to receive the wrenching projections and is provided with a suitable handle.

Figure 8:
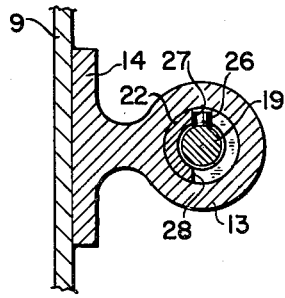
FIGURE 8 is a cross section taken along 8—8 of FIGURE 2.

In the event that the operating member 16 and the locking hook 19 are rotated to the orientation of the locked position while the hatch is open, the lowering of the hatch will merely cause the hook 21 to engage the top of the keeper 41. This will cause the locking hook 19 to move axially upward relative to the base member 13. To lock the assembly, it is then necessary to rotate the operating member 16 to the unlocked position to move the hook 21 to clear the keeper 41 as shown in FIGURE 3 and then rotate the operating member 16 back to the locked position. The stop pin 26 is proportioned to be in engagement with the wall 27 when the assembly is in the locked position as shown in FIGURE 8. When the locking hook 19 is rotated by the operating member 16 to the unlocked position, the stop pin moves into engagement with the wall 28. In the event that the locking hook 19 is rotated relative to the operating member 16 causing the drive sleeve 31 to slip while the latch assembly is unlocked and the hatches are open, proper orientation will be re-established by merely rotating the operating member 16 to one or the other of its extremes of rotation. Therefore, the device cannot be jammed by improper handling of the device or by external impacts.

Those skilled in the art will recognize that the various elements of the latch assembly can be fabricated economically. The base member 13 and the operating member 16 are preferably castings which need only be machined to form the bores to receive the sleeves. The cams 42 and 43 do not require accurate finishes so the casting can be used as cast eliminating the need of high cost cam forming machining operations. Because close tolerances are not necessary, dependable operation will be realized even under the adverse environmental conditions of marine usage.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A latching device for securing two elements together comprising a tubular body member mounted on one element, a keeper mounted on the other element, a rod extending through said body member formed with a hook rotatable from a first position clear of said keeper to a second position in latching engagement with said keeper, an operating member around said rod on the side of said body member remote from said hook for operating the rod, drive means connected to the operating member and to the rod to rotate the rod upon actuation of the operating member, the operating member having a slippable connection with the drive means to permit continued rotation of the operating member independently of the drive means when the hook is disposed in said second position, and means operative upon said continued rotation of the operating member to reciprocate the rod axially to draw said elements together to secure said elements to each other.

2. A latching device for securing two elements together comprising a tubular body member mounted on one element, a keeper mounted on the other element, a rod extending through said body member formed with a hook rotatable from a first position clear of said keeper to a second position in latching engagement with said keeper, an operating member around said rod on the side of said body member remote from said hook for operating the rod, drive means connected to the operating member and to the rod to rotate the rod upon actuation of the operating member, the operating member having a slippable connection with the drive means to permit continued rotation of the operating member independently of the drive means when the hook is disposed in said second position, and cam means between said body member and said operating member operative upon said continued rotation of the operating member to reciprocate the rod axially to draw said elements together to secure said elements to each other.

3. A latching device for securing two elements together comprising a tubular body member mounted on one element, a keeper mounted on the other element, a rod extending through said body member formed with a hook rotatable from a first position clear of said keeper to a second position in latching engagement with said keeper, an operating member around said rod on the side of said body member remote from said hook for operating the rod, a sleeve positioned in said operating member with a press fit formed with an axial slot and a bore through which said rod extends, a projection on said rod within said slot whereby rotation of said operating member rotates said rod between said first and second positions, said press fit of the sleeve in the operating member providing a slippable connection of the sleeve in the operating member to permit continued rotation of the operating member independently of said sleeve when the hook is disposed in said second position, and cam means between said body member and said operating member operative upon said continued rotation of the operating member to reciprocate the rod axially to draw said elements together to secure said elements to each other.

4. A latching device for securing two elements together comprising a tubular body member mounted on one element, a keeper mounted on the other element, a rod extending through said body member formed with a hook rotatable from a first position clear of said keeper to a second position in latching engagement with said keeper, stops on said body member and rod limiting rotational movement of said rod beyond said first position in a direction away from said second position, an operating member around said rod on the side of said body member remote from said hook for operating the rod, drive means connected to the operating member and to the rod to rotate the rod upon actuation of the operating member, the operating member having a slippable connection with the drive means to permit continued rotation of the operating member independently of the drive means when the hook is disposed in said second position, and cam means between said body member and said operating member operative upon said continued rotation of the operating member to reciprocate the rod axially to draw said elements together to secure said elements to each other.

5. A device for releasably securing a hatch cover against a coaming comprising a tubular body secured to said cover, a keeper mounted on said coaming below said body, a rod extending through said body formed with a hook at its lower end rotatable between a first position clear of said keeper and a second position in engagement with said keeper, a stop on said rod above said body, a tubular operator around said rod above said body engaging said stop, friction drive means connected between said rod and operator operable to rotate said hook between said first and second positions upon rotation of said operator, said friction drive means having a slippable connection with said operator to permit continued rotation of the operator independently of the friction drive means when the hook is disposed in said second position, and cam means on said body and operator operable upon said continued rotation of said operator to lift said hook against said keeper after said hook is in said second position.

6. A latch for releasably securing a hatch cover against a coaming comprising a tubular body secured to said cover, a keeper mounted on said coaming below said body, a rod extending through said body formed with a hook at its lower end rotatable between a first position clear of said keeper and a second position in engagement with said keeper, an adjustable stop on said rod above said body including a resilient element, a tubular operator around said rod above said body engaging said stop, friction drive means connected between said rod and operator operable to rotate said hook between said first and second positions upon rotation of said operator, said friction drive means having a slippable connection with said operator to permit continued rotation of the operator independently of the friction drive means when the hook is disposed in said second position, and cam means on said body and operator operable upon said continued rotation of said operator to compress said element and lift said hook against said keeper after said hook is in said second position.

7. A latch for releasably securing a hatch cover against a coaming comprising a tubular body secured to said cover, a keeper mounted on said coaming below said body, a rod extending through said body formed with a hook at its lower end rotatable between a first position clear of said keeper and a second position in engagement with said keeper, a stop on said rod above said body, a tubular operator around said rod above said body engaging said stop, a drive sleeve around said rod positioned within said operator with a press fit, means on said sleeve and rod permitting relative axial motion therebetween and preventing relative rotation therebetween, said press fit of the sleeve in the operator providing a slippable connection of the sleeve in the operator to permit continued rotation of the operator independently of said sleeve when the hook is disposed in said second position, and cam means on said body and operator operable upon said continued rotation of said operator to lift said hook against said keeper after said hook is in said second position.

8. A latching device for securing one element to another element comprising, a keeper on one element and a hook on said other element, said hook being formed on a rod and said rod being rotatable to move the hook from a first position clear of said keeper to a second position in latching engagement with said keeper, a base member supporting said rod for rotation, an operating member for rotating the rod, drive means connected to the operating member and to the rod to rotate the rod by actuation of the operating member, the operating member having a slippable connection with the drive means to permit continued rotation of the operating member independently of the drive means when the hook is disposed in said second position, and means operative by said continued rotation of the operating member to reciprocate the rod axially to draw said elements together to secure said elements to each other.

References Cited in the file of this patent
UNITED STATES PATENTS

| | | |
|---|---|---|
| 258,997 | Crandal | June 6, 1882 |
| 377,648 | Sinning | Feb. 7, 1888 |
| 2,670,232 | Schmitz | Feb. 23, 1954 |
| 2,860,904 | Barry et al. | Nov. 18, 1958 |